United States Patent [19]

Wegmann et al.

[11] Patent Number: 5,470,896
[45] Date of Patent: Nov. 28, 1995

[54] STORAGE-STABLE SOLUTIONS OF ACCELERATOR SYSTEMS

[75] Inventors: Alex Wegmann, Allschwil; Heinz Wolleb, Chesalles, both of Switzerland

[73] Assignee: Ciba-Geigy Corporation, Ardsley, N.Y.

[21] Appl. No.: 376,539

[22] Filed: Jan. 20, 1995

Related U.S. Application Data

[63] Continuation of Ser. No. 168,741, Dec. 16, 1993, abandoned.

[30] Foreign Application Priority Data

Dec. 22, 1992 [CH] Switzerland ............ 3938/92-9

[51] Int. Cl.⁶ .................. C08K 5/17; C08L 63/02
[52] U.S. Cl. .................. 523/428; 523/454; 523/455; 523/456; 528/92; 528/412; 528/413; 528/414
[58] Field of Search .................. 523/428, 454, 523/455, 456; 528/92, 412, 413, 414

[56] References Cited

U.S. PATENT DOCUMENTS

| | | | |
|---|---|---|---|
| 2,837,493 | 6/1958 | Schlenker | 260/33.4 |
| 3,367,913 | 2/1968 | Satorre et al. | 260/47 |
| 3,492,269 | 1/1970 | Janssen et al. | 260/47 |
| 3,978,026 | 8/1976 | Katzakian, Jr. et al. | 260/47 |
| 4,130,511 | 12/1978 | Andrews | 528/92 |
| 5,135,994 | 8/1992 | Anagnoston | 525/507 |
| 5,198,146 | 3/1993 | Shomer | 252/182.24 |

FOREIGN PATENT DOCUMENTS

| | | |
|---|---|---|
| 0083813 | 7/1983 | European Pat. Off. |
| 0471988 | 2/1992 | European Pat. Off. |
| 1105772 | 3/1968 | United Kingdom |
| 9012824 | 11/1990 | WIPO |

OTHER PUBLICATIONS

DIN 53151, Dec. 1970, pp. 123-126.

*Primary Examiner*—Melvyn I. Marquis
*Assistant Examiner*—D. Aylward
*Attorney, Agent, or Firm*—William A. Teoli, Jr.

[57] ABSTRACT

Solutions of accelerator systems comprising a binary system comprising
a) 10 to 90% by weight of a salt of formula I $$[Me]_m^{x\oplus}[R]_n^{y\ominus} \qquad (I),$$

wherein x and y are the respective number of charges and m and n are each a number 1, 2, 3 or 4, Me is a metal atom and R is the radical of an alcohol, phenol or thiophenol or of a carboxylic acid or thiocarboxylic acid, or 10 to 90% by weight of a salt of formula II $$[Me_1]_m^{x\oplus}[A]_n^{y\ominus} \qquad (II),$$

with an organic complex former containing one or more hetero atoms having free electron pairs, wherein $Me_1$ is a metal atom or a group of the formula $N(R_1)_4$, $S(R_1)_3$ or $P(R_1)_4$ wherein each $R_1$ independently of the others is hydrogen, an unsubstituted or substituted $C_1$–$C_6$alkyl or aryl radical, A is any anion and x, y, m and n are as defined above, and b) 90 to 10% by weight of an organic solvent containing at least one —OH, —OR$_1$, —COOH, —COOR$_1$, —COR$_1$ or —CON(R$_1$)$_2$ group wherein R$_1$ is hydrogen, an unsubstituted or substituted $C_1$–$C_6$alkyl or aryl radical, are storage-stable with respect to temperature and time and do not precipitate, and the use thereof, for example for accelerating the hardening of epoxy resin/amine combinations, the drying times being in the range of about 15 to 40 minutes.

9 Claims, No Drawings

STORAGE-STABLE SOLUTIONS OF ACCELERATOR SYSTEMS

This application is a continuation of application Ser. No. 08/168,741, filed Dec. 16, 1993, abn.

The present invention relates to novel, storage-stable solutions of accelerator systems and to the preparation and use thereof, for example as accelerators in the hardening of epoxy resin/amine combinations.

It is known that the hardening of epoxy resin/amine systems, for example in surface-coatings, both the drying on the surface and the full hardening of the entire coating layer, when carried out at ambient temperature, takes place only slowly over a period of several hours. Such long drying times are undesirable, however, especially in the case of the intermediate drying of multi-layer coatings. Attempts have therefore been made to accelerate the hardening process by the addition of about 5% of certain accelerators, such as especially 2,4,6-tris(dimethylaminomethyl)phenol. Although the drying time can thereby be reduced by more than half, it still does not fulfil the requirements of industrial-scale use.

GB-A-1 105 772 proposes as a solution to this problem the use of inorganic nitrate salts as accelerators, but those salts result in only a slight acceleration. Furthermore, EP-A-83813 proposes an accelerator system which is a combination of an inorganic salt (for example a nitrate) and a compound having at least three amino groups, but that system also has an insufficient accelerator action. Recently, EP-A-0 47 1 988 has proposed an accelerator system which comprises a combination of the above-mentioned 2,4,6-tris(dimethylaminomethyl)phenol and an inorganic nitrate salt with an aliphatic alcohol and, optionally, also water. Although such systems do bring about a further reduction in the hardening time, they have the serious disadvantage that they are not storage-stable and after only a few weeks at a temperature of about 20° C. begin to precipitate and form a sediment; those systems too are therefore unsuitable for industrial purposes.

The above-mentioned conventional accelerator systems are therefore either insufficiently reactive or are not storage-stable.

An aim of the present invention is therefore to develop an accelerator system which, on the one hand, is storage-stable both with respect to temperature and with respect to time and which, on the other hand, can be used industrially, without an adverse effect being exerted on the drying speed.

That aim is achieved by an accelerator system that is a solution that comprises a binary system comprising:

a) 10 to 90% by weight of a salt of formula I

   (I), wherein x and y are the respective number of charges and m and n are each a number 1, 2, 3 or 4, Me is a metal atom and R is the radical of an alcohol, phenol or thiophenol or of a carboxylic acid or thiocarboxylic acid, or 10 to 90% by weight of a salt of formula II

   (II), with an organic complex former containing one or more hetero atoms having free electron pairs, wherein $Me_1$ is a metal atom or a group of the formula $N(R_1)_4$, $S(R_1)_3$ or $P(R_1)_4$ wherein each $R_1$ independently of the others is hydrogen, an unsubstituted or substituted $C_1$–$C_6$alkyl or aryl radical, A is any anion, and x, y, m and n are as defined above, and b) 90 to 10% by weight of an organic solvent containing at least one —OH, —$OR_1$, —COOH, —$COOR_1$, —$COR_1$ or —$CON(R_1)_2$ group wherein $R_1$ is hydrogen, an unsubstituted or substituted $C_1$–$C_6$alkyl or aryl radical.

The accelerator system according to the invention may accordingly be a system comprising a) 10 to 90% by weight of a salt of formula I

   (I), wherein x and y are the respective number of charges and m and n are each a number 1, 2, 3 or 4, Me is a metal atom and R is the radical of an alcohol, phenol or thiophenol or of a carboxylic acid or thiocarboxylic acid, and b) 90 to 10% by weight of an organic solvent containing at least one —OH, —$OR_1$, —COOH, —$COOR_1$, —$COR_1$ or —$CON(R_1)_2$ group wherein $R_1$ is hydrogen, an unsubstituted or substituted $C_1$–$C_6$alkyl or aryl radical, or a system comprising a) 10 to 90% by weight of a salt of formula II

   (II), with an organic complex former containing one or more hetero atoms having free electron pairs, wherein $Me_1$ is a metal atom or a group of the formula $N(R_1)_4$, $S(R_1)_3$ or $P(R_1)_4$ wherein each $R_1$ independently of the others is hydrogen, an unsubstituted or substituted $C_1$–$C_6$alkyl or aryl radical, A is any anion, and x, y, m and n are as defined above, and b) 90 to 10% by weight of an organic solvent containing at least one —OH, —$OR_1$, —COOH, —$COOR_1$, —$COR_1$ or —$CON(R_1)_2$ group wherein $R_1$ is hydrogen, an unsubstituted or substituted $C_1$–$C_6$alkyl or aryl radical.

Preferred accelerator systems according to the invention comprise 25 to 75% by weight of a salt of formula I or of a salt of formula II with the complex former, and 25 to 75% by weight of a solvent b).

The symbols in the above formulae are defined as follows:

Me is any metal cation from the main groups, sub-groups or the transition elements of the Periodic Table. Li, Na, K, Mg, Ca, Ba, Fe, Co, Ni, Cu, Zn, Sn, Al, La and Ce are of special interest, with Li, Ca, Ba, Fe, Zn, Al and La being preferred.

R as an alcohol radical is, for example, —$OC_2H_5$, —$OC_4H_9$—n, —$OC_6H_{13}$—n, —$OC_2H_4NH_2$ and —$OC_2H_4N(CH_3)_2$.

R as a phenol or thiophenol radical is, for example, a radical of formula III

   (III)

wherein
X is O— or S—,
n is a number 1 or 2, and

Y is a group of the formula

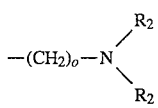

wherein o is a number 0, 1, 2, 3 or 4, each $R_2$ is hydrogen or independently of the other an unsubstituted or substituted $C_1$–$C_{20}$alkyl radical, and m is a number 1, 2 or 3.

X in formula (HI) is preferably O.

R as a carboxylic acid radical is, for example, the radical of propionic acid, lauric acid, salicylic acid, aminobenzoic acid, aminocaproic acid, caproic acid, aminocyclohexanecarboxylic acid or hydroxyphenylacetic acid.

R as a thiocarboxylic acid radical is, for example, the radical of thiopropionic acid, thiocaproic acid, thiolauric acid, thiobenzoic acid, thioacetic acid or dithioacetic acid.

$Me_1$ may be the same metal cations as those defined above under Me and may additionally be a $N(R_1)_4$—, $S(R_1)_3$— or $P(R_1)_4$— radical wherein each $R_1$ independently of the others is hydrogen, unsubstituted or substituted $C_1$–$C_6$alkyl or aryl.

$Me_1$ is preferably Li, Ca, Fe or La.

A is any anion, for example Cl, Br, I, $NO_3$, $NO_2$, $ClO_3$, $ClO_4$, $SbF_6$, $AsF_6$, $AsF_6$, $AsF_6$, $PF_6$, $BF_4$, CN, SCN, $R_3$—COO, $R_3$—$SO_3$, $R_3$—$SO_2$, $PO_4$, $HPO_4$ or $H_2PO_4$ wherein $R_3$ is unsubstituted or substituted $C_1$–$C_6$alkyl or aryl; preferred anions are Br, I, $NO_3$, triflate (trifluoromethyl sulfonate), capronate, perchlorate and propionate.

$R_1$ and $R_3$ as unsubstituted or substituted $C_1$–$C_6$alkyl radicals are either straight-chain or branched alkyl radicals, for example methyl, ethyl, n-propyl, isopropyl, n-butyl, sec-butyl, tert-butyl, n-pentyl, isopentyl, n-hexyl and isohexyl radicals.

$R_3$ as an aryl radical is, for example, phenyl or α-naphthyl.

$R_2$ and $R_4$ (according to formula IV below) as $C_1$–$C_{20}$alkyl radicals are alkyl radicals that are preferably straight-chain or may be branched. n-Butyl and n-octyl are of special interest.

$R_4$ (according to formula IV below) as a trialkylsilyl radical is preferably the trimethylsilyl radical.

$R_5$ (according to formula IV below) as a $C_1$–$C_6$alkyl radical is a straight-chain or branched alkyl radical, as mentioned above under $R_3$. $R_5$ is preferably the methyl group.

When alkyl and aryl radicals $R_1$, $R_2$ and $R_3$ are substituted, they may be mono- or poly-substituted, especially by halogen, such as fluorine, chlorine and bromine, by $NO_2$ or by alkoxy, such as methoxy or ethoxy.

Preferred salts of formula I are the Al, Fe, La, Zn, Ca, Li and Ba salts of 2,4,6-tris(dimethylaminomethyl)phenol. Preferred salts of formula II are especially lithium bromide, lithium iodide, lithium nitrate, lithium perchlorate, calcium nitrate, calcium capronate, calcium perchlorate, calcium iodide, calcium propionate, iron(III) nitrate and lanthanum triflate. Anhydrous $CaI_2$ and $Ca(NO_3)_2$ are especially preferred.

Suitable organic solvents are those containing at least one —OH, —$OR_1$, —COOH, —$COOR_1$, —$COR_1$ or —$CON(R_1)_2$ group. Examples thereof are: aliphatic monoalcohols, such as methanol, ethanol, 1-butanol and methoxypropyl alcohol, and also aliphatic dialcohols, such as ethylene glycol; ketones, such as methyl ethyl ketone and methyl isobutyl ketone, and also ethers, such as butyl methyl ether. Mixtures of organic solvents may also be used, however.

The organic complex formers preferably contain at least two hetero atoms having free electron pairs, such as N, O and S, which are so arranged that they are able to form with the cation $Me_1$ a 5-, 6- or 7-membered chelate ring.

Preferred organic complex formers are: benzyldimethylamine, 2,4,6-tris(dimethylaminomethyl)phenylbutyl ether, 2,4,6-tris(dimethylaminomethyl)phenyloctyl ether, 3-dimethylaminophenol, 3-dimethylaminophenylbutyl ether, 3-dimethylaminophenyloctyl ether, malic acid dimethyl ester, N,N-dimethylphenylalanine methyl ester, piperidinoethylamine, N,N-dimethylaminoethylpiperidine, 2,4,6-tris-(dimethylaminomethyl)phenol, thiourea, salicylic acid or 2,4,6-tris(dimethylaminomethyl)phenyl-trimethylsilyl ether.

Special interest is accorded to accelerator systems that comprise 25 to 75% by weight of a salt of formula I wherein Me is Li, Na, K, Mg, Ca, Ba, Fe, Co, Ni, Cu, Zn, Sn, Al, La or Ce and R is the radical of a phenol or thiophenol of formula III

wherein
X is O— or S—,
n is a number 1 or 2, and
Y is a group of formula

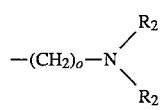

wherein o is a number 1, 2, 3 or 4, $R_2$ is hydrogen or unsubstituted or substituted $C_1$–$C_{20}$alkyl and m is a number 1, 2 or 3, and especially those wherein Me is Li, Ba, Ca, Zn, Al, Fe or La and R is 2,4,6-tris(dimethylaminomethyl)phenol, and the solvent is methanol, ethanol, a propanol, a butanol, methyl ethyl ketone, methyl isobutyl ketone, ethylene glycol, dimethoxyethane or methoxypropyl alcohol.

Preferred accelerator systems are also those comprising 25 to 75% by weight of a salt of formula II wherein $Me_1$ is Li, Na, K, Mg, Ca, Ba, Fe, Co, Ni, Cu, Zn, Sn, Al, La, Ce, $N(R_1)_4$, $S(R_1)_3$ or $P(R_1)_4$ wherein $R_1$ is as defined above, and A is Cl, Br, I, $NO_3$, $NO_2$, $ClO_3$, $ClO_4$, $SbF_6$, $AsF_6$, $PF_6$, Bh, CN, SCN, $R_3$—COO, $R_3$—$SO_3$, $R_3$—$SO_2$, $PO_4$, $HPO_4$ or $H_2PO_4$ wherein $R_3$ is unsubstituted or substituted $C_1$–$C_6$alkyl or aryl, and the organic complex former either corresponds to formula IV

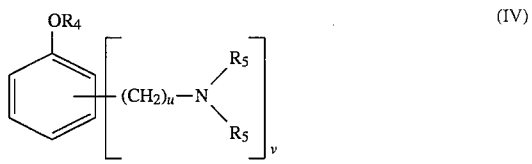

wherein $R_4$ is hydrogen, $C_1$–$C_{20}$alkyl or trialkyl($C_1$–$C_4$)silyl, u is a number 0, 1 or 2, $R_5$ is $C_1$–$C_6$alkyl and v is a number 1, 2 or 3, or is a malic acid di($C_1$–$C_4$)alkyl ester, an N,N-di($C_1$–$C_4$)alkylphenylalanine ($C_1$–$C_4$)alkyl ester, thiourea or unsubstituted or substituted salicylic acid or a piperdine derivative,
and especially those wherein $Me_1$ is Li, Ca, Fe or La and A is $NO_3$, Br, I, triflate, capronate, perchlorate or propionate, and the organic complex former is benzyldimethylamine, 2,4,6-tris(dimethylaminomethyl)phenylbutyl ether, 2,4,6-tris(dimethylaminomethyl)phenyloctyl ether, 3-dimethylaminophenol, 3-dimethylaminophenylbutyl ether, 3-dimethylaminophenyloctyl ether, malic acid dimethyl ester, N,N-dimethylphenylalanine methyl ester, piperidinoethylamine, N,N-dimethylaminoethylpiperidine, 2,4,6-tris(dimethylaminomethyl)phenol, thiourea, salicylic acid or 2,4,6-tris(dimethylaminomethyl)phenyl-trimethylsilyl ether, and the solvent is methanol, ethanol, a propanol, a butanol, methyl ethyl ketone, methyl isobutyl ketone, ethylene glycol or methoxypropyl alcohol.

In the accelerator system according to the invention the salt of formula II may be present together with the organic complex former in the form of a stoichiometric complex, for example in the form of a 1:2 complex. Such 1:2 metal complexes have, for example, the following structure which illustrates the salt $Ca(NO_3)_2$ with the complex former of formula IV:

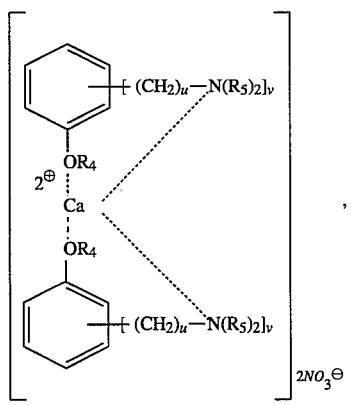

wherein the symbols are as defined.

Finally, preference is given generally to those accelerator systems which are completely anhydrous, that is to say in which the salts of formula II used also contain no water of crystallisation and which also contain solvents that are anhydrous.

The accelerator systems according to the invention are clear solutions that are very stable. They are storage-stable over a prolonged period of time, at least 9 months (no precipitate and also no sediment being formed and the clear solution remaining as such) and in a temperature range of approximately from −10° C. to +50° C. They ensure rapid hardening times and therefore represent efficient accelerators. The accelerating action is not impaired by several months' storage. As a result, they are extremely well suited to industrial-scale use.

It is surprising, considering the teaching of EP-A-0 47 1 988, that salts other than nitrates according to formula II can also be used and, for example, etherified derivatives of aminophenol of formula II can also be employed or completely different molecules, for example alcohols or carboxylic acids, can be used instead of the aminophenols of formula IV, without an adverse effect being produced. It is especially interesting in this connection that sterically voluminous substituents, for example the octyl group as symbol $R_4$ in formula IV, can be used. Also in connection with the salts of formula I it is surprising that structurally large, strongly lipophilic anions R can be used. There is no lessening of the accelerating action.

The accelerator systems according to the invention are prepared, for example, by mixing the individual components, that is to say by mixing the salt of formula I with the organic solvent or by mixing the salt of formula II with the complex former and the organic solvent advantageously at a temperature of from 10° C. to 40° C., the order in which the components are added being unimportant. When a salt of formula I is prepared, conversion of the salt into another salt is sometimes necessary, for example a $Ca^{2+}$ salt is prepared by conversion of the corresponding Na or K salt.

The salts of formulae I and II, the organic solvents and some of the complex formers are known and can be obtained according to known methods.

The accelerator systems according to the invention and the 1:2 metal complex accelerators are used, for example, for hardening epoxy resin/amine combinations, such as surface-coating systems, the drying times being in the range of about 15 to 40 minutes. Suitable amines are, for example, aliphatic, cycloaliphatic and aromatic amines, especially polyamines and more especially polyamidoamines. Combinations of those amines with the accelerator systems according to the invention and, optionally, organic solvents are likewise storage-stable for a period of at least 9 months in a temperature range of from −10° C. to +50° C. In addition, in many cases the accelerator systems advantageously dissolve also in the amine hardeners. The hardened epoxy/amine systems are used especially in surface protection (for example surface-coatings, floor coverings), in building (for example as injection resins or trowelling compounds) or as casting and encapsulating resins. In all those applications the resins accelerated according to the invention exhibit very good adhesive strength.

In the following Examples the invention is described in more detail without the invention being limited thereto. The abbreviation "RT" represents room temperature of about 20°–25° C. The solid content is to be understood as meaning that when a solution is concentrated by evaporation the given solid content is obtained.

EXAMPLE 1

5.9 g (0.025 mol) of calcium nitrate tetrahydrate are dissolved in 25 ml of 1-butanol with stirring and gentle heating, and then 6.3 g (0.047 mol) of benzyldimethylamine are added. A clear colourless solution of the accelerator (calcium benzyldimethylamine nitrate complex; solid content 37.6%) is obtained.

EXAMPLE 2

53.1 g (0.2 mol) of 2,4,6-tris(dimethylaminomethyl)phenol and 6.8 g (0.02 mol) of tetrabutylammonium hydrogen sulfate are placed in 100 ml of toluene in a 350 ml sulfonating flask having an anchor mixer, thermometer, reflux condenser and dropping funnel and at RT 40 g (0.5 tool) of a 50% aqueous NaOH solution are added dropwise in the course of 30 minutes. The suspension is then stirred for 30 minutes at 80° C. and then at the same temperature 54.8 g (0.4 mol) of butyl bromide are added in the course of 45 minutes. After a subsequent reaction period of 3 hours the mixture is cooled and filtered, and the filtrate is washed once with 30 ml of $H_2O$, dried over $MgSO_4$, filtered and concentrated by evaporation, yielding 48 g of 2,4,6-tris(dimethylaminomethyl)phenylbutyl ether in the form of a brown liquid which no longer has an OH band in the IR spectrum and of which the NMR analysis is in agreement with the said structure.

5.9 g (0.025 tool) of calcium nitrate tetrahydrate are dissolved in 25 ml of 1-butanol with stirring and gentle heating, and then 15.1 g (0.047 mol) of 2,4,6-tris(dimethylaminomethyl)phenylbutyl ether are added. A clear, brown solution of the accelerator (calcium nitrate complex of the above butyl ether; solid content 50.9%) is obtained.

EXAMPLE 3

106.16 g (0.4 mol) of 2,4,6-tris(dimethylaminomethyl)phenol and 13.58 g (0.04 mol) of tetrabutylammonium hydrogen sulfate are placed in 200 ml of toluene in a 750 ml sulfonating flask having an anchor mixer, thermometer, reflux condenser and dropping funnel and at RT 80 g (1.0 tool) of a 50% aqueous NaOH solution are added dropwise in the course of 30 minutes. The suspension is then stirred for 30 minutes at 80° C. and then at the same temperature 154.5 g (0.8 mol) of octyl bromide are added in the course of 45 minutes. After a subsequent reaction period of 2 hours the mixture is cooled and filtered, and the filtrate is washed once with 30 ml of H20, dried over $MgSO_4$, filtered and concentrated by evaporation, yielding 137.4 g of 2,4,6-tris(dimethylaminomethyl)phenyloctyl ether in the form of a brown, highly viscous liquid which no longer has an OH band in the IR spectrum and of which the NMR analysis is in agreement with the said structure.

2.85 g (0.0125 mol) of calcium nitrate tetrahydrate are dissolved in 35.4 g of 1-butanol with stirring and gentle heating, and then 8.85 g (0.0235 mol) of 2,4,6-tris(dimethylaminomethyl)phenyloctyl ether are added. A clear, orange solution of the accelerator (calcium nitrate complex of the above octyl ether; solid content 25%) is obtained.

EXAMPLE 4

5.9 g (0.025 mol) of calcium nitrate tetrahydrate are dissolved in 25 ml of 1-butanol with stirring and gentle heating, and then 6.4 g (0.047 mol) of 3-dimethylaminophenol are added. A clear, dark-brown solution of the accelerator (calcium nitrate complex of the above aminophenol; solid content 37.8%) is obtained.

EXAMPLE 5

54.8 g (0.4 mol) of 3-dimethylaminophenol and 13.58 g (0.04 mol) of tetrabutylammonium hydrogen sulfate are placed in 200 ml of toluene in a 750 ml sulfonating flask having an anchor mixer, thermometer, reflux condenser and dropping funnel and at RT 80 g (1.0 mol) of a 50% aqueous NaOH solution are added dropwise in the course of 30 minutes. The suspension is then stirred for 30 minutes at 80° C. and then at the same temperature 109.6 g (0.8 mol) of butyl bromide are added in the course of 45 minutes. After a subsequent reaction period of 2 hours the mixture is cooled and filtered, and the filtrate is washed once with 70 ml of $H_2O$, dried over $MgSO_4$, filtered and concentrated by evaporation. The crude product is distilled under a high vacuum, yielding 64 g of 3-dimethylaminophenylbutyl ether in the form of a colourless liquid having a boiling point of 94°–96° C. (0.08 mbar) which no longer has an OH band in the IR spectrum and of which the NMR analysis is in agreement with the said structure.

2.85 g (0.0125 mol) of calcium nitrate tetrahydrate are dissolved in 22.3 g of 1-butanol with stirring and gentle heating, and then 4.5 g (0.0235 mol) of 3-dimethylaminophenylbutyl ether are added. A clear, colourless solution of the accelerator (calcium nitrate complex of the above butyl ether; solid content 25%) is obtained.

EXAMPLE 6

200 ml of toluene, 54.8 g (0.4 mol) of 3-dimethylaminophenol and 13.58 g (0.04 mol) of tetrabutylammonium hydrogen sulfate are placed in a 750 ml sulfonating flask having an anchor mixer, thermometer, reflux condenser and dropping funnel and at RT 80 g (1.0 mol) of a 50% aqueous NaOH solution are added dropwise in the course of 30 minutes. The suspension is then stirred for 30 minutes at 80° C. and then at the same temperature 154 g (0.8 mol) of octyl bromide are added in the course 45 minutes. After a subsequent reaction period of 2.5 hours the mixture is cooled and filtered, and the filtrate is washed with 1×70 ml of $H_2O$, dried over $MgSO_4$, filtered and concentrated by evaporation. The crude product is distilled under a high vacuum, yielding 65.5 g of 3-dimethylaminophenyloctyl ether in the form of a colourless liquid having a boiling point of 150°–152° C. (0.1 mbar) which no longer has an OH band in the IR spectrum and of which the NMR analysis is in agreement with the sand structure.

2.85 g (0.0125 mol) of calcium nitrate tetrahydrate are dissolved in 26.4 g of 1-butanol with stirring and gentle heating, and then 5.8 g (0.0235 mol) of 3-dimethylaminophenyloctyl ether are added. A clear, slightly yellow solution of the accelerator (calcium nitrate complex of the above octyl ether; solid content 25%) is obtained.

EXAMPLE 7

5.9 g (0.025 mol) of calcium nitrate tetrahydrate are dissolved in 40.5 g of 1-butanol with stirring and gentle heating, and then 7.6 g (0.047 mol) of manic acid dimethyl ester are added. A clear, colourless solution of the accelerator (calcium nitrate complex of the above dimethyl ester; solid content 25%) is obtained.

EXAMPLE 8

100 ml of methanol and 10 g (0.05 mol) of N,N-dimethylphenylalanine (prepared in accordance with Y. Ikutani, Bull. Chem. Soc. Jpn. 41, 1679 (1968)) are placed in a 350 ml sulfonating flask having an anchor mixer, thermometer, reflux condenser and gas introduction tube and, with stirring, saturated with HCl gas. The solution is stirred at reflux for 8 hours, then cooled, and the solvent is evaporated in a rotary evaporator. The residue is taken up in 250 ml of methylene chloride and washed first with 10% aqueous $NaHCO_3$ solution and then with $H_2O$ until neutral. The reaction mixture is then dried over $MgSO_4$, filtered and concentrated by evaporation. The residue is purified by flash chromatography (hexane/ethyl acetate=7:3), yielding 5.0 g of N,N-dimethylphenylalanine methyl ester in the form of a slightly yellow liquid. NMR analysis and IR spectrum agree with the said structure.

0.62 g (2.65 mmol) of calcium nitrate tetrahydrate are dissolved in 4.9 g of 1-butanol with stirring and gentle heating, and then 1 g (5 mmol) of N,N-dimethylphenylalanine methyl ester is added. A clear, yellow solution of the accelerator (calcium nitrate complex of the above methyl ester; solid content 25%) is obtained.

EXAMPLE 9

5.9 g (0.025 mol) of calcium nitrate tetrahydrate are dissolved in 25 ml of 1-butanol with stirring and gentle heating, and then 5.6 g (0.047 mol) of piperidinoethylamine are added. A clear, slightly yellow solution of the accelerator (calcium nitrate complex of the above ethylamine; solid content 36.2%) is obtained.

EXAMPLE 10

2.17 g (0.025 mol) of lithium bromide are dissolved in 25 ml of 1-butanol with stirring and gentle heating, and then 5.6 g (0.047 mol) of piperidinoethylamine are added. A clear, slightly yellow solution of the accelerator (lithium bromide complex of the above ethylamine; solid content: 27.9%) is obtained.

EXAMPLE 11

14.4 g (0.1 mol)of 1-chloro-2-dimethylaminoethane hydrochloride, 17.03 g (0.2 mol) of piperidine, 8 g (0.2 mol) of NaOH and 2 g (6 mmol) of tetrabutylammonium hydrogen sulfate in 100 ml of xylene are placed in a 350 ml sulfonating flask having a stirrer, thermometer and reflux condenser and stirred at reflux for 5 hours. The reaction mixture is cooled and filtered, and the filtrate is washed twice with 50 ml of $H_2O$, dried over $MgSO_4$, filtered and distilled under a water-jet vacuum, yielding 7.0 g of N,N-dimethylaminoethylpiperidine in the form of a clear, colourless liquid having a boiling point of 93° C. (30 T or $3.99 \times 10^3$ Pa). NMR and elemental analysis agree with the said structure. 1.5 g (6.2 mmol) of calcium nitrate tetrahydrate are dissolved in 9.8 g of methanol with stirring and gentle heating, and then 1.8 g (11.75 mmol) of N,N-dimethylaminoethylpiperidine are added. A clear, colourless solution of the accelerator (calcium nitrate complex of the above piperidine; solid content 25%) is obtained.

EXAMPLE 12

3.3 g (0.025 mol) of lithium iodide are dissolved in 25 ml of 1-butanol, and then 12.5 g (0.047 mol) of 2,4,6-tris(dimethylaminomethyl)phenol are added. A clear, slightly yellow solution of the accelerator (lithium iodide complex of the above phenol; solid content 43.8%) is obtained.

EXAMPLE 13

3 g (0.0125 mol) of iron(HI) nitrate are dissolved in 27.6 g of methanol, and then 6.25 g (0.0235 mol) of 2,4,6-tris(dimethylaminomethyl)phenol are added. A clear, dark reddish-brown solution of the accelerator (iron nitrate complex of the above phenol; solid content 25%) is obtained.

EXAMPLE 14

0.9 g (0.125 mol)of lithium nitrate is dissolved in 21.3 g of 1-butanol, and then 6.25 g (0.0235 mol) of 2,4,6-tris-(dimethylaminomethyl)phenol are added. A clear, slightly yellow solution of the accelerator (lithium nitrate complex of the above phenol; solid content 25%) is obtained.

EXAMPLE 15

40 ml of $H_2O$ are placed in a 100 ml round-bottomed flask having a magnetic stirrer, and 12.78 g (85 mmol) of trifluoromethanesulfonic acid are weighed in. With stirring, 14.15 g (15 mmol) of lanthanum carbonate are added. The neutral suspension is filtered, and the filtrate is concentrated by evaporation in a rotary evaporator and then dried under a high vacuum. 18.0 g of lanthanum triflate are obtained in the form of a white powder.

2 g (2.89 mmol) of lanthanum triflate are dissolved in 10.5 g of methanol, and then 1.5 g (5.65 mmol) of 2,4,6-tris(dimethylaminomethyl)phenol are added. A clear, slightly yellow solution of the accelerator (lanthanum triflate complex of the above phenol; solid content 25%) is obtained.

EXAMPLE 16

14.82 g (0.2 mol) of calcium hydroxide are weighed into a 250 ml round-bottomed flask having a magnetic stirrer and dropping funnel; 100 ml of $H_2O$ are added and then, with stirring, 46.46 g (0.4 mol) of caproic acid are added dropwise thereto. A white precipitate is formed which is filtered and washed with $H_2O$. Drying under a high vacuum yields 51.3 g of calcium capronate in the form of a white solid.

3.4 g (0.0 125 mol) of calcium capronate are dissolved in 28.8 g of methanol, and then 6.23 g (0.0235 mol) of 2,4,6-tris(dimethylaminomethyl)phenol are added. A clear, slightly yellow solution of the accelerator (calcium capronate complex of the above phenol; solid content 25%) is obtained.

EXAMPLE 17

2.98 g (0.0125 mol) of calcium perchlorate are dissolved in 27.6 g of 1-butanol, and then 6.25 g (0.0235 mol) of 2,4,6-tris(dimethylaminomethyl)phenol are added. A clear, slightly yellow solution of the accelerator (calcium perchlorate complex of the above phenol; solid content 25%) is obtained.

EXAMPLE 18

4.57 g (0.0125 mol) of calcium iodide are dissolved in 32.4 g of 1-butanol, and then 6.25 g (0.0235 mol) of 2,4,6-tris(dimethylaminomethyl)phenol are added. A clear, slightly yellow solution of the accelerator (calcium iodide complex of the above phenol; solid content 25%) is obtained.

EXAMPLE 19

53.1 g (0.2 mol) of 2,4,6-tris(dimethylaminomethyl)phenol and 100 ml of $H_2O$ are placed in a 500 ml round-bottomed flask having a magnetic stirrer and dropping funnel and, with stirring, 16.0 g (0.2 mol) of a 50% aqueous NaOH solution are added dropwise thereto. The clear, slightly yellow solution is concentrated by evaporation in a rotary evaporator at 70° C., and the residue is dried at 100° C./125 T ($16.6 \times 10^3$ Pa), yielding 55.1 g of sodium 2,4,6-tris(dimethylaminomethyl)phenolate in the form of a brownish solid of which the elemental analysis is as follows:

|  | theor. | found |
| --- | --- | --- |
| % C | 62.69 | 62.31 |
| % H | 9.12 | 9.36 |
| % N | 14.62 | 14.01 |
| % Na | 8.46 | 8.00 |

20 g (0.069 mol) of sodium 2,4,6-tris(dimethylaminomethyl)phenolate and 57.1 g of 1-butanol are placed in a 100 ml round-bottomed flask having a magnetic stirrer, and then 8.70 g (0.023 mol) of aluminium nitrate are added. The solution is stirred for 2 hours, and then the precipitated sodium nitrate is filtered off. A clear, brown 25% accelerator solution of aluminium tris(2,4,6-tris(dimethylaminomethyl)phenolate) in 1-butanol is obtained.

EXAMPLE 20

8.6 g (0.03 mol) of sodium 2,4,6-tris(dimethylaminomethyl)phenolate (preparation see Example 19) and 25.5 g of 1-butanol are placed in a 100 ml round-bottomed flask having a magnetic stirrer, and then 4.04 g (0.01 mol) of iron(III) nitrate are added. The solution is stirred for 2 hours, and then the precipitated sodium nitrate is filtered off. A clear, dark-brown 25% accelerator solution of iron tris(2,4,6-tris(dimethylaminomethyl)phenolate) in 1-butanol is obtained.

EXAMPLE 21

8.6 g (0.03 mol) of sodium 2,4,6-tris(dimethylaminomethyl)phenolate (preparation see Example 19) and 28 g of 1-butanol are placed in a 100 ml round-bottomed flask having a magnetic stirrer, and then 4.33 g (0.01 mol) of lanthanum nitrate are added. The solution is stirred for 45 minutes, and then the precipitated sodium nitrate is filtered off. A clear, dark-brown 25% accelerator solution of lanthanum tris(2,4,6-tris(dimethylaminomethyl)phenolate) in 1-butanol is obtained.

EXAMPLE 22

5.7 g (0.02 mol) of sodium 2,4,6-tris(dimethylaminomethyl)phenolate (preparation see Example 19) and 17.9 g of 1-butanol are placed in a 100 ml round-bottomed flask having a magnetic stirrer, and then 3.0 g (0.01 mol) of zinc nitrate are added. The solution is stirred for 45 minutes, and then the precipitated sodium nitrate is filtered off. A clear, dark-brown 25% accelerator solution of zinc bis(2,4,6-tris(dimethylaminomethyl)phenolate) in 1-butanol is obtained.

EXAMPLE 23

In a 250 ml round-bottomed flask having a magnetic stirrer and reflux condenser, 12.3 g (0.052 mol) of calcium nitrate tetrahydrate are dissolved in 88.7 g of 1-butanol, and then 31.55 g (0.104 mol) of potassium (2,4,6-tris(dimethylaminomethyl)phenolate) (prepared in the same manner as the sodium salt according to Example 19) are added. The solution is stirred at reflux for 1 hour and then cooled. The precipitated potassium nitrate is filtered off. A clear, yellow 25% accelerator solution of calcium bis( 2,4,6-tris-(dimethylaminomethyl)phenolate) in 1-butanol is obtained.

EXAMPLE 24

11.81 g (0.05 mol) of calcium nitrate tetrahydrate are dissolved in 81.1 g of methanol, and then 15.22 g (0.20 mol) of thiourea are added. A clear colourless solution of the accelerator (calcium nitrate complex of the above thiourea; solid content 25%) is obtained.

EXAMPLE 25

1.33 g (0.0125 mol) of lithium perchlorate are dissolved in 22.5 g of 1-butanol, and 6.2 g (0.0235 mol) of 2,4,6-tris(dimethylaminomethyl)phenol are added. A clear, slightly yellow solution of the accelerator (lithium perchlorate complex of the above phenol; solid content 25%) is obtained.

EXAMPLE 26

1.25 g (5.32 mmol) of calcium nitrate tetrahydrate are dissolved, with heating, in 14.7 g of Dowanol® (trade name of Dow Chem. Corp. U.S.A. for methoxypropyl alcohol), and then 3.77 g (10 mmol) of 2,4,6-tris(dimethylaminomethyl)phenyloctyl ether (preparation see Example 3) are added. A clear brown solution of the accelerator (calcium nitrate complex of the above octyl ether; solid content 25%) is obtained.

EXAMPLE 27

11.8 g of calcium nitrate tetrahydrate are dissolved in 50 ml of ethanol, and then a solution of 30.35 g of potassium (2,4,6-tris(dimethylaminomethyl)phenolate (preparation see Example 23) in 100 ml of ethanol is added. The mixture is then stirred at RT for 30 minutes and then filtered, and the filtrate is concentrated by evaporation at 70° C. in a rotary evaporator. The product is dried under a high vacuum at 45° C., yielding 30 g of calcium bis(2,4,6-tris(dimethylaminomethyl)phenolate) in the form of a brown solid having a theoretically correct combustion analysis with respect to C, H, N, Ca and K. 5 g (9.8 mmol) of calcium bis(2,4,5-tris(dimethylaminomethyl)phenolate) are dissolved in 15 g of dimethoxyethane. A clear, brown solution of the accelerator (solid content 25%) is obtained.

EXAMPLE 28

5 g (9.8 mmol) of calcium bis(2,4,6-tris(dimethylaminomethyl)phenolate) (preparation see Example 27) are dissolved in 66.4 g of methyl ethyl ketone. A clear brown solution of the accelerator (solid content 7%) is obtained.

EXAMPLE 29

5 g (9.8 mmol) of calcium bis(2,4,6-tris(dimethylaminomethyl)phenolate) (preparation see Example 27) are dissolved in 15 g of ethylene glycol. A clear brown solution of the accelerator (solid content 25%) is obtained.

EXAMPLE 30

5 g (9.8 mmol) of calcium bis(2,4,6-tris(dimethylaminomethyl)phenolate) (preparation see Example 27) are dissolved in 30.7 g of methyl isobutyl ketone. A clear brown solution of the accelerator (solid content 14%) is obtained.

EXAMPLE 31

Analogously to Example 1, 4.3 g (0.025 mol) of calcium nitrate (dried for 24 hours at 200° C./$10^{-2}$ T (1.33 Pa)) are dissolved in 31.9 g of 1-butanol with stirring a gentle heating, and then 6.3 g (0.047 mol) of benzyldimethylamine are added. A clear colourless solution of the accelerator (calcium nitrate complex of the above amine; solid content 25%) is obtained.

EXAMPLE 32

Analogously to Example 18, 3.7 g (0.0125 mol) of calcium iodide (dried for 24 hours at 200° C./$10^{-2}$ T (1.33 Pa)) are dissolved in 29.6 g of 1-butanol, and then 6.25 g (0.0235 mol) of 2,4,6-tris(dimethylaminomethyl)phenol are added. A clear, slightly yellow solution of the accelerator (calcium iodide complex of the above phenol; solid content 25%) is obtained.

EXAMPLE 33

Analogously to Example 5, 2.15 g (0.0125 mol) of calcium nitrate (dried for 24 hours at 200° C./$10^{-2}$ T (1.33 Pa)) are dissolved in 20 g of 1-butanol with stirring and gentle heating, and then 4.5 g (0.0235 mol) of 3-dimethylaminophenylbutyl ether are added. A clear, colourless solution of the accelerator (calcium nitrate complex of the above butyl ether; solid content 25%) is obtained.

EXAMPLE 34

With stirring, 1.33 g (0.0125 mol) of lithium perchlorate and 6.2 g (0.0235 mol) of 2,4,6-tris(dimethylaminomethyl)phenol are dissolved in 22.5 g of 1-butanol. A clear, slightly yellow solution of the accelerator (lithium perchlorate complex of the above phenol; solid content 25%) is obtained.

EXAMPLE 35

With stirring, 2.16 g (0.0125 mol) of calcium nitrate (dried for 24 hours at 200° C./$10^{-2}$ T (1.33 Pa)) and 3.2 g (0.0235 mol) of salicylic acid are dissolved in 16.2 g methanol. A clear, colourless solution of the accelerator (lithium nitrate complex of the above salicylic acid; solid content 25%) is obtained.

EXAMPLE 36

Analogously to Example 19, starting from 53.1 g (0.2 mol) of 2,4,6-tris(dimethylaminomethyl)phenol and 9.2 g (0.2 mol) of lithium hydroxide there are obtained 54.3 g of lithium 2,4,6-tris(dimethylaminomethyl)phenolate in the form of an orange solid of which the elemental analysis is as follows:

| | |
|---|---|
| % C | 66.67 |
| % H | 10.01 |
| % N | 15.21 |
| % Li | 1.52 |

Starting from that solid a 25% solution of the accelerator in 1-butanol is prepared.

EXAMPLE 37

Analogously to Example 23, using barium nitrate, a 25% solution of barium bis(2,4,6-tris(dimethylaminomethyl)phenolate) in butanol is prepared. A clear brown solution of the accelerator is obtained.

EXAMPLE 38

47.8 g (0.18 mol) of 2,4,6-tris(dimethylaminomethyl)phenol are stirred for 8 hours in a mixture of 32.3 g (0.2 mol) of hexamethyldisilazane and 4 drops of trimethylchlorosilane at 170° C. under a nitrogen atmosphere. The crude product is distilled at 130° C./0.1 T (13.3 Pa), yielding 41.1 g of 2,4,6-tris(dimethylaminomethyl)phenyl-trimethylsilyl ether in the form of a clear, colourless oil of which NMR and IR analyses agree with the said structure.

2.95 g (0.0125 mol) of calcium nitrate tetrahydrate are dissolved in 12.5 ml of 1-butanol. 7.93 g (0.0235 mol) of 2,4,6-tris(dimethylaminomethyl)phenyl-trimethylsilyl ether are then added. A clear, colourless solution of the accelerator (calcium nitrate complex of the above silyl ether; solid content 51.8%) is obtained.

EXAMPLE 39

2.95 g (0.0125 mol) of calcium nitrate tetrahydrate are dissolved in 12.5 ml of 1-butanol. 6.23 g (0.0235 mol) of 2,4,6-tris(dimethylaminomethyl)phenol and 3.44 g (0.0235 mol) of 1-butyl-trimethylsilyl ether (prepared from 1-butanol and trimethylchlorosilane in accordance with known methods) are then added. A clear, slightly yellow solution of the accelerator (solid content 40%) is obtained.

EXAMPLE 40

Analogously to Example 3, a 25% solution of the accelerator 2,4,6-tris(dimethylaminomethyl)phenyloctyl ether and dried calcium nitrate (24 hours at 200° C./$10^{-2}$ T (1.33 Pa)) in 1-butanol is prepared (calcium nitrate complex of the above octyl ether).

EXAMPLE 41

Analogously to Example 16, a 25% solution of the accelerator calcium propionate (prepared analogously to calcium capronate) and 2,4,6-tris(dimethylaminomethyl)phenol in methanol is prepared (calcium propionate complex of the above phenol).

EXAMPLE 42

Analogously to Example 9, a 25% solution of the accelerator piperidinoethylamine and lithium iodide in 1-butanol is prepared (lithium iodide complex of the, above ethylamine).

EXAMPLE 43

17.6 g (0.1073 mol) of dried calcium nitrate are dissolved with stirring and with heating at 40° C in 25.4 g of absolute ethanol. 57.0 g (0.2148 mol) of 2,4,6 -tris(dimethylaminomethyl)phenol are then added. A clear, dark-yellow solution of the accelerator (calcium nitrate complex of the above phenol; solid content 75%) is obtained.

EXAMPLE 44

11.3 g of an accelerator according to Example 43 are dissolved in 63.4 g of a polyamidoamine (amine content 4.2–4.6 eq./kg) and 25.4 g of methyl isobutyl ketone with stirring and with heating at 40° C. A clear, yellow solution of the accelerator in the amine hardener is obtained.

EXAMPLE 45

Preparation of an accelerator system dissolved in hardener according to Example 44 and storage of that system for 3 months. A brown, clear solution of the accelerator in the hardener is obtained.

EXAMPLE 46

75 g of an epoxy resin based on bisphenol A (epoxy content 2.00–2.23 eq./kg) dissolved in 25 g of xylene are mixed well with 37.5 g of a polyamidoamine (amine content 4.2–4.6 eq./kg) and 5–10% by weight (based on the amount of epoxy resin solution) of an accelerator (prepared in accordance with Examples 1, 5, 6, 7, 12, 18 to 25, 31 to 34, 36, 37, 40 and 43–45). The accelerator may also be used, however, premixed with the polyamidoamine and a little solvent. The coating formulation so prepared is then diluted with a mixture of xylene and n-butanol (in a ratio of 4:1) until the solid content is 52%. The coating formulation is then filtered through a gauze filter and then applied using a knife application device or a film-spreading frame to suitable substrates (glass plates or pickled and degreased iron plates) so that a coating film having a dry film thickness of about 20 μm is obtained.

In Table I below, the technical properties of the applied coating films during and after hardening are described. The hardening and the coating tests are carried out at 20° C. and 65% relative humidity. In addition, the storage stability of the accelerator after two months in the solvent used in accordance with the given Example is also indicated.

TABLE I

| Accelerator prepared according to Example | 1 | 5 | 6 | 7 | 12 | 18 |
|---|---|---|---|---|---|---|
| Appearance of the accelerator after 2 months | clear colourless solution | colourless clear solution | slightly yellow clear solution | colourless clear solution | yellowish clear solution | yellowish clear solution |
| Concentration of accelerator* | 7.5 | 5 | 5 | 5 | 8.8 | 5 |
| Dust dry time of the coating film (min.)** | 15 | 50 | 60 | 90 | 75 | 35 |
| Appearance of the coating film*** | i.o.**** | i.o.**** | i.o.**** | i.o.**** | i.o.**** | i.o.**** |
| Transparency of the coating film*** | clear | clear | clear | clear | clear | clear |
| Pendulum hardness acc. to Persoz | | | | | | |
| after 24 hours | 165 | 200 | 210 | 160 | 245 | 245 |
| after 48 hours | 225 | 270 | 260 | 270 | 280 | 305 |
| after 7 days | 310 | 335 | 340 | 360 | 325 | 325 |
| after 14 days | 330 | 365 | 370 | 365 | 345 | 365 |
| Adhesive strength (DIN 53151), after 14 days | Gt 0 | Gt 1 | Gt 1 | Gt 0 | Gt 0 | Gt 1 |

| Accelerator prepared according to Example | 19 | 20 | 21 | 22 | 23 | 24 |
|---|---|---|---|---|---|---|
| Appearance of the accelerator after 2 months | brown clear solution | dark-brown clear solution | dark-brown clear solution | dark-brown clear solution | yellow clear solution | colourless clear solution |
| Concentration of accelerator* | 5 | 5 | 5 | 5 | 5 | 5 |
| Dust dry time of the coating film (min)** | 90 | 75 | 90 | 60 | 40 | 90 |
| Appearance of the coating film*** | yellowish | yellow | i.o.**** | slightly brownish slight orange skin | i.o.**** | i.o.**** |
| Transparency of the coating film*** | clear | clear | clear | clear | clear | clear |
| Pendulum hardness acc. to Persoz | | | | | | |
| after 24 hours | 130 | 160 | 205 | 135 | 235 | 110 |
| after 48 hours | 130 | 260 | 210 | 150 | 285 | 145 |
| after 7 days | 250 | 325 | 335 | 165 | 345 | 175 |
| after 14 days | 290 | 340 | 345 | 285 | 355 | 215 |
| Adhesive strength (DIN 53151), after 14 days | Gt 4 | Gt 5 | Gt 5 | Gt 5 | Gt 2 | Gt 4 |

| Accelerator prepared according to Example | 25 | 31 | 32 | 33 | 34 | 36 |
|---|---|---|---|---|---|---|
| Appearance of the accelerator after 2 months | yellowish clear solution | colourless clear solution | yellowish clear solution | colourless clear solution | yellowish clear solution | yellow clear solution |
| Concentration of accelerator* | 5 | 5 | 5 | 5 | 5 | 5 |
| Dust dry time of the coating film (min.)** | 90 | 30 | 20 | 45 | 90 | 105 |
| Appearance of the coating film*** | i.o.**** | i.o.**** | i.o.**** | i.o.**** | i.o.**** | i.o.**** |
| Transparency of the coating film*** | clear | clear | clear | clear | clear | clear |
| Pendulum hardness acc. to Persoz | | | | | | |
| after 24 hours | 250 | 205 | 215 | 200 | 250 | 230 |
| after 48 hours | 290 | 245 | 280 | 260 | 290 | 235 |
| after 7 days | 340 | 310 | 340 | 315 | 340 | 320 |
| after 14 days | 340 | 340 | 355 | 340 | 340 | 325 |
| Adhesive strength (DIN 53151), after 14 days | Gt 4 | Gt 2 | Gt 1 | Gt 1 | Gt 4 | Gt 5 |

TABLE I-continued

| Accelerator prepared according to Example | 37 | 40 | 43 | 44 | 45 |
|---|---|---|---|---|---|
| Appearance of the accelerator after 2 months | brown clear solution | yellowish clear solution | yellowish clear solution | yellow clear solution | brown clear solution |
| Concentration of accelerator* | 5 | 5 | 5 | 5 | 5 |
| Dust dry time of the coating film (min)** | 110 | 30 | 30 | 22 | 15 |
| Appearance of the coating film*** | i.o.**** | i.o.**** | i.o.**** | i.o.**** | i.o.**** |
| Transparency of the coating film*** | clear | clear | clear | clear | clear |
| Pendulum hardness acc. to Persoz | | | | | |
| after 24 hours | 140 | 230 | 240 | 245 | 205 |
| after 48 hours | 170 | 280 | 270 | 280 | 270 |
| after 7 days | 245 | 315 | 335 | 335 | 320 |
| after 14 days | 320 | 345 | 355 | 350 | 340 |
| Adhesive strength (DIN 53151), after 14 days | Gt 4 | Gt 0 | Gt 0 | Gt 1 | Gt 1 |

*% by weight with respect to amount of epoxy resin solution
**Apparatus according to Dr. Landolt
***after 24 hours
**** = in order (visual assessment)
Gt means cross-cut test on coating materials

What is claimed is:

1. A solution of an accelerator system, which comprises a binary system comprising:

a) 10 to 90% by weight of a salt of formula I $$[Me]_m^{x\oplus}[R]_n^{y\ominus} \quad (I),$$

wherein x and y are the respective number of charges and m and n are each a number 1, 2, 3 or 4, Me is a metal atom and R is the radical of an alcohol, phenol or thiophenol or of a carboxylic acid or thiocarboxylic acid, or 10 to 90% by weight of a salt of formula II $$[Me_1]_m^{x\oplus}[A]_n^{y\ominus} \quad (II),$$

with an organic complex former containing one or more hetero atoms having free electron pairs, wherein $Me_1$ is a metal atom or a group of the formula $N(R_1)_4$, $S(R_1)_3$ or $P(R_1)_4$ wherein each $R_1$ independently of the others is hydrogen, an unsubstituted or substituted $C_1$–$C_6$alkyl or aryl radical, A is any anion and x, y, m and n are as defined above, and wherein the salts of formula II used contain no water of crystallisation and also contain solvents that are anhydrous, and b) 90 to 10% by weight of an organic solvent selected from a monohydric alcohol and a solvent containing at least one —$OR_1$ or —$COR_1$ group wherein $R_1$ is hydrogen, an unsubstituted or substituted $C_1$–$C_6$alkyl or aryl radical.

2. A solution of an accelerator system according to claim 1, wherein the accelerator system comprises 25 to 75% by weight of a salt of formula I or a salt of formula II with the complex former, and 25 to 75% by weight of a solvent b) according to claim 1.

3. A solution of an accelerator system according to claim 1, wherein in formula I Me is Li, Na, K, Mg, Ca, Ba, Fe, Co, Ni, Cu, Zn, Sn, Al, La or Ce and R is the radical of a phenol or thiophenol of formula III

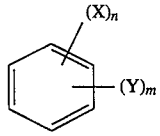

wherein
X is O— or S—,
n is a number 1 or 2, and
Y is a group of formula

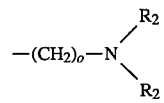

wherein o is a number 0, 1, 2, 3 or 4, each $R_2$ is hydrogen or independently of the other unsubstituted or substituted $C_1$–$C_{20}$alkyl, and m is a number 1, 2 or 3, and the solvent is a solvent according to claim 1.

4. A solution of an accelerator system according to claim 3, wherein in formula I Me is Li, Ba, Ca, Zn, Al, Fe or La and R is 2,4,6-tris(dimethylaminomethyl)phenol and the solvent is methanol, ethanol, a propanol, a butanol, methyl ethyl ketone, methyl isobutyl ketone, dimethoxyethane or methoxypropyl alcohol.

5. A solution of an accelerator system according to claim 1, wherein in formula II $Me_1$ is Li, Na, K, Mg, Ca, Ba, Fe, Co, Ni, Cu, Zn, Sn, Al, La, Ce or $N(R_1)_4$, $S(R_1)_3$ and $P(R_1)_4$, with $R_1$ being as defined in claim 1, and A is Cl, Br, I, $NO_3$, $NO_2$, $ClO_3$, $ClO_4$, $SbF_6$, $AsF_6$, $PF_6$, $BF_4$, CN, SCN, $R_3$—COO, $R_3$—$SO_3$, $R_3$—$SO_2$, $PO_4$, $HPO_4$ or $H_2PO_4$ wherein $R_3$ is unsubstituted or substituted $C_1$–$C_6$alkyl or aryl, and the organic complex former either corresponds to formula IV

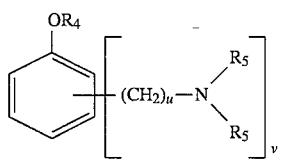 (IV)

wherein $R_4$ is hydrogen, $C_1$–$C_{20}$alkyl or trialkyl($C_1$–$C_4$)silyl, u is a number 0, 1 or 2, $R_5$ is $C_1$–$C_6$alkyl and v is a number 1, 2 or 3,
or is a malic acid di($C_1$–$C_4$)alkyl ester, an N,N-di($C_1$–$C_4$)alkylphenylalanine ($C_1$–$C_4$)alkyl ester, thiourea or unsubstituted or substituted salicylic acid or a piperidine derivative, and the solvent is a solvent according to claim 1.

6. A solution of an accelerator system according to claim 5, wherein $Me_1$ is Li, Ca, Fe or La and A is $NO_3$, Br, I, triflate, capronate, perchlorate or propionate and the organic complex former is benzyldimethylamine, 2,4,6-tris(dimethylaminomethyl)phenylbutyl ether, 2,4,6-tris(dimethylaminomethyl)phenyloctyl ether, 3-dimethylaminophenol, 3-dimethylaminophenylbutyl ether, 3-dimethylaminophenyloctyl ether, malic acid dimethyl ester, N,N-dimethylphenylalanine methyl ester, piperidinoethylamine, N,N-dimethylaminoethylpiperidine, 2,4,6-tris(dimethylaminomethyl)phenol, thiourea, salicylic acid or 2,4,6-tris(dimethylaminomethyl)phenyl-trimethylsilyl ether, and the solvent is methanol, ethanol, a propanol, a butanol, methyl ethyl ketone, methyl isobutyl ketone, ethylene glycol or methoxypropyl alcohol.

7. A solution of an accelerator system according to claim 1, wherein the accelerator system comprises 10 to 90% by weight of a stoichiometric 1:2 complex comprising a salt of formula II

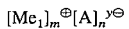 (II), wherein the symbols are as defined in claim 1, with an organic complex former containing one or more hetero atoms having free electron pairs, and
90 to 10% by weight of an organic solvent containing at least one —OH, —$OR_1$, —COOH, —$COOR_1$, —$COR_1$ or —$CON(R_1)_2$ group wherein $R_1$ is hydrogen, an unsubstituted or substituted $C_1$–$C_6$alkyl or aryl radical.

8. The preparation of a solution of an accelerator system according to claim 1 by mixing the individual components at a temperature of from 10° C. to 40° C.

9. A method of hardening epoxy resin/amine combinations by adding to these combinations a solution of an accelerator according to claim 1.

\* \* \* \* \*